Patented Oct. 31, 1950

2,528,022

UNITED STATES PATENT OFFICE 2,528,022

PURIFICATION OF ANTIBIOTICS BY ION EXCHANGE PROCEDURES

Robert Wayne Van Dolah, Wyoming, George L. Christenson, Cincinnati, and Robert S. Shelton, Mariemont, Ohio, assignors, by mesne assignments, to Chas. Pfizer & Co., Inc., a corporation of New Jersey No Drawing. Application January 27, 1945, Serial No. 574,972

11 Claims. (Cl. 167—65)

This invention relates to improvements in the production of the basic antibiotics, such as streptothricin and streptomycin. It is in particular related to the separation or extraction of the antibiotic from the broth or mother liquor in which it is produced by fermentation, or from other impure aqueous solutions.

Certain antibiotics, particularly streptothricin and streptomycin, are basic amines. They form salts with acids, and indeed are commonly produced as the hydrochlorides. They are produced from molds and certain bacteria, such as *A. lavendulae* (streptothricin). A simple method of growing the mold or the like is in deep culture fermenters, following technique now fairly well standardized. The procedure heretofore used for separation or extraction of the antibiotic from the broth has involved some such procedure as adsorbing the active material on charcoal, eluting the charcoal carrying the adsorbed material with alcoholic hydrochloric acid, neutralizing the acid, usually with sodium hydroxide, removing the alcohol by extraction with ether, and finally drying the product, with or without further purification as by dialysis or other procedures, as by desiccation from the frozen state or in other ways. Most of these antibiotics are not as labile as penicillin, and the rigid requirements with respect to drying of penicillin are not necessarily applicable to the drying of such antibiotics as streptothricin and streptomycin. With the recovery procedures heretofore used, the yields have been low, the product obtained has been strongly colored, and the concentrate has contained a great deal of sodium chloride. Losses as high as 50% in producing the initial concentrate and a further loss of 50% of the active material in the concentrate in removing sodium chloride therefrom have been reported.

The present invention provides improvements in the extraction of these antibiotics which give an extract or concentrate substantially free from sodium chloride and substantially colorless. Also, the yields of active material are very high, as much as 70% or more of the active material present in the initial broth being recovered. The final product produced in accordance with the invention is ordinarily a solution of an addition salt, usually the hydrochloride, of the basic antibiotic, substantially free from salt, which can be concentrated or dried in any of the usual ways to give a final product relatively free from impurities; although in certain applications of the invention to be described, the product may contain a considerable proportion of sodium chloride or other salt.

In accordance with the most advantageous application of the present invention, the antibiotic is separated from the culture broth by adsorption from the broth with a cationic base exchange material, in particular an organic cationic base exchange material such as aldehyde-polyhydric phenol resins. Typical useful agents of this type are the resinous cationic exchange resins containing acidic groups sold under the trade names "Amberlite I. R.-100" and "Amberlite I. R.-1" (Resinous Products and Chemical Company). See U. S. Patent 2,104,501 to Adams and Holmes for a description of cationic exchange resins useful for adsorbing the basic antibiotics from the culture broth. Other organic cationic base exchange materials, such as products obtained by the sulfonation of humic acid-containing materials may be used, but less advantageously because of lower capacity, instability, or the like.

After the base exchange resin has adsorbed a sufficient quantity of the antibiotic, so that it approaches the point at which it will not adsorb any more, or the point at which substantial proportions of antibiotic appear in the effluent, the resin is eluted with aqueous acid, advantageously hydrochloric acid. The resulting extract contains the antibiotic in the form of the hydrochloride, together with free acid, an excess of acid being necessarily used for effective elution. The resulting solution is then brought into contact with an anionic base exchange material, such as one of the phenol formaldehyde alkyl polyamine resins, such as the product sold as "Amberlite I. R.-4" (Resinous Products and Chemical Company). See Patent 2,151,883 to Adams and Holmes for a description of resins which may be used for this purpose. Other anionic exchange resins may, of course, be used. This material removes the excess hydrochloric acid and gives a final solution of the hydrochloride of the antibiotic which is free or nearly free from extraneous materials, and in particular, inorganic salts. This final solution may be concentrated or dried in the usual way.

The adsorption of the antibiotic from the broth is very efficient, and the cationic base exchange materials have a very large capacity. The antibiotic appears to be selectively adsorbed, and the exchange material appears to be capable of replacing the antibiotic cation in the solution with either hydrogen ions, or sodium ions, or even other metal ions, depending upon the condition of the base exchange material. Thus, assuming that the operation commences with a base exchange material which has been washed with hydrochloric acid, so that the exchange ions attached to it are hydrogen ions, the base exchange material apparently initially replaces all of the cations in the culture broth with hydrogen, adsorbing the antibiotic, sodium, potassium, etc. The material soon becomes saturated with respect to sodium, potassium and other ions of low weight, but nevertheless continues to adsorb the antibiotic efficiently, apparently by replacing the antibiotic ions with sodium or potassium or similar ions. Thus, when the culture broth is caused to flow over a base exchange material of this character which has just been washed with hydrochloric acid, the pH of the effluent may initially be as low as 1.65, indicating the replacement of substantially all of the cations in it by hydrogen ions. After a short time, the pH will rise to about 6, nearly the original pH of the broth, indicating that the sodium and potassium and similar ions are no longer being adsorbed. Adsorption of the antibiotic ions, however, continues efficiently. Thus, in one instance, a column of "Amberlite I. R.–100" 1" in diameter and 16" deep, was used for the removal of streptothricin from a culture broth. After 200 cc. of effluent, the pH dropped to 1.65 and remained at that level while another 1000 cc. of effluent were drawn off. The pH then rapidly rose to about 6 while the next 600 to 800 cc. of effluent were withdrawn. Thereafter the pH gradually rose to about 6.45 after 6000 cc. of effluent had been withdrawn. In this case the original broth had a pH of 6.50.

It has also been established that the resins will function by exchange of sodium or similar ions with adsorption of the antibiotic ions. Thus, a resin treated so that substantially all of the hydrogen ions replaceable by sodium ions were replaced by sodium ions effectively removed streptothricin from a culture broth.

The capacity of the resin for adsorbing streptothricin and similar antibiotics, while it has not been definitely established, is very high. Thus, a column of resin 1" in diameter and 16" deep effectively removed all of the streptothricin from 15 liters of culture broth assaying approximately 70 units per cc. In another test about 1,500,000 units of streptothricin were adsorbed from 29 liters of broth in the same column and the resin was still not saturated.

Similarly, the adsorption of the excess acid used in elution by the anionic base exchange resins is very efficient, the final solution obtained being substantially neutral.

The invention will be further illustrated by the following example dealing with the extraction of streptothricin from its culture medium, but it is not limited thereto.

The culture broth from a deep vat fermentation is stirred with 2 to 5% of a suitable filter aid, such as a diatomaceous earth (Hyflo Super Cel) and is filtered using a filter press or suction filter. The filtrate is then passed by downward flow through a column of the cationic base exchange resin "Amberlite I. R.–100" at a rate of 1–½ to 4 gallons per square foot per minute until the streptothricin appears in the effluent in substantial quantity, determined by assay. The column is then back-washed with water at a rate sufficient to give a bed expansion of about 30 to 50% until the effluent is clear. The column is then drained. An excess of dilute (4%) hydrochloric acid is passed downwardly through the column at a rate of about 1 to 1½ gallons per square foot per minute. The column is then washed with distilled water. The hydrochloric acid solution and the wash water are combined and passed downwardly through a column containing an anionic base exchange resin "Amberlite I. R.–4" in quantity sufficient to remove the excess acid in the solution. The anionic column is then rinsed with distilled water and the effluents are combined. The streptothricin in the form of the hydrochloride is contained in this solution, and can be recovered therefrom by the usual procedures, such as by desiccation from the frozen state. Yields of 70% or more of the streptothricin present in the initial broth are obtainable. The anion column is back-washed and regenerated by passing a dilute (2%) solution of sodium carbonate through it downwardly. The amount of sodium carbonate solution used is such as to remove the acid adsorbed. The column is then washed and is ready for a repetition of the cycle.

The concentrations and quantities of acid solutions and the like used in the procedure do not appear to be critical. Concentrated acid or alkaline solutions, should, of course, be avoided. Other acids than hydrochloric acid may be used, but because the final product will appear as the salt of the acid used, hydrochloric acid will ordinarily be the acid of choice.

While the invention has been particularly described with respect to the extraction of streptothricin, it its applicable to the extraction of other antibiotics which are amine bases, in particular streptomycin and tyrocidin, to the separation of tyrothricin into the gramicidin and tyrocidin fractions, the tyrocidin being selectively adsorbed by the cationic base exchange resin, etc. The term antibiotic as used herein, in accordance with its accepted meaning, refers to a substance produced during the growth of a microorganism and which in high dilution is antagonistic to one or more other microorganisms when added to media in which the latter normally grow.

Also while the invention has been described as applied to the separation of the antibiotic from the culture broth in which it is produced, it is also applicable to the purification of solutions of these antibiotics obtained in other ways. Thus, it is known that streptothricin and the like can be adsorbed on charcoal, and the antibiotic removed from the charcoal by elution with acid. The resulting product, however, is ordinarily highly colored, and furthermore will contain relatively large quantities of sodium chloride incident to the neutralization of the acid used for elution. The present invention can be applied to the purification of such concentrates. In particular, if the acid solution obtained by the elution of charcoal carrying the adsorbed antibiotic is passed over an anionic base exchange resin, the excess acid is readily removed without the formation of sodium chloride or, where the solution resulting from the elution of charcoal carrying adsorbed antibiotic is neutralized, this solution, containing a large quantity of sodium chloride, may be passed over a cationic base exchange resin, the antibiotic being selectively adsorbed, while the sodium chloride and other materials in the solution pass through in the effluent. Removal of the antibiotic from the cationic base exchange resin is then accomplished as previously described, the treatment being no different than where the antibiotic is adsorbed directly from the culture broth. In this latter type of operation, care must be taken that the concentration of the sodium chloride in the solution is not too high, because if the sodium chloride concentration is excessively high, and the antibiotic concentration relatively low, the sodium may selectively replace the antibiotic.

We claim:

1. A process for recovering and purifying a basic antibiotic containing a salt-forming amino group from an aqueous solution in which it is mixed with inorganic salt impurities which comprises contacting said solution with a solid synthetic organic cation exchange material until this material effectively removes and binds the antibiotic from the solution, eluting the antibiotic from the antibiotic-binding material, and recovering the antibiotic from the eluate.

2. A process for recovering and concentrating a basic antibiotic containing a salt-forming amino group from a dilute aqueous solution in which it is mixed with inorganic salt impurities which comprises passing said solution through a bed of synthetic organic cation exchange resin until a substantial amount of antibiotic is adsorbed by said resin, removing the antibiotic from said resin with a relatively small amount of an eluting agent, and recovering the antibiotic therefrom.

3. A process for recovering from its filtered culture broth a basic antibiotic of the class consisting of streptomycin, streptothricin and tyrocidin, which process comprises passing said filtered broth over a synthetic organic cation exchange resin until a substantial amount of antibiotic is adsorbed thereon, then washing the resin, eluting the antibiotic from the washed resin with a dilute solution of an acid, substantially neutralizing the eluate and recovering the antibiotic therefrom.

4. A process for recovering streptomycin from its filtered culture broth which comprises passing said broth over a synthetic organic cation exchange resin containing acidic groups until a substantial amount of streptomycin is adsorbed thereon, eluting the streptomycin therefrom with dilute aqueous hydrochloric acid, substantially neutralizing the eluate and recovering the streptomycin therefrom.

5. A process for recovering an antibiotic of the class consisting of streptomycin, streptothricin and tyrocidin, from a dilute aqueous solution in which it is mixed with inorganic salt impurities, which comprises passing said solution over an organic cation exchange material containing acidic groups until a substantial amount of antibiotic is adsorbed thereon, eluting the antibiotic therefrom with a dilute solution of an acid, and recovering the antibiotic from the eluate.

6. A process for recovering from its filtered culture broth and purifying, an antibiotic of the class consisting of streptomycin, streptothricin and tyrocidin, which comprises passing said filtered broth over a synthetic organic cation exchange resin containing acidic groups, until the resin adsorbs and becomes substantially saturated with the antibiotic, eluting the antibiotic from adsorbed condition on the resin with a dilute aqueous acid, removing substantially all excess acid from the eluate, and recovering the antibiotic therefrom.

7. A process for recovering a basic antibiotic containing a salt-forming amino group from a dilute aqueous solution in which it is mixed with inorganic salt impurities, which comprises contacting said solution with a synthetic organic cation exchange resin containing acidic groups until a substantial amount of the antibiotic is adsorbed by said resin, eluting the antibiotic therefrom with a dilute solution of an acid, and recovering the antibiotic from the eluate.

8. A process for recovering and concentrating a basic antibiotic containing a salt-forming amino group from its filtered culture broth, which comprises contacting said filtered broth with a solid synthetic organic cation exchange material containing acidic groups until a substantial amount of the antibiotic is adsorbed thereon, removing the antibiotic therefrom with a relatively small amount of an eluting agent, and recovering the antibiotic from the eluate.

9. A process for recovering from its filtered culture broth an antibiotic of the class consisting of streptomycin, streptothricin, and tyrocidin, which process comprises passing said filtered broth over a synthetic organic cation exchange resin until a substantial amount of the antibiotic is adsorbed thereon, eluting the antibiotic from the resin with a dilute solution of an acid, and recovering the antibiotic from the eluate.

10. A process for recovering streptomycin from its filtered culture broth, which comprises contacting said broth with a synthetic organic cation exchange resin containing acidic groups until a substantial amount of streptomycin is adsorbed by said resin, eluting the antibiotic therefrom with a dilute solution of an acid, and recovering the streptomycin from the eluate.

11. A process for separating a basic antibiotic containing a salt-forming amino group from water-soluble inorganic salt impurities associated therewith, which comprises contacting a dilute aqueous solution of said antibiotic and impurities with a synthetic organic cation exchange resin containing acidic groups, until a substantial amount of the antibiotic is selectively adsorbed by said resin in preference to the impurities.

ROBERT WAYNE VAN DOLAH.
GEORGE L. CHRISTENSON.
ROBERT S. SHELTON.

REFERENCES CITED

The following references are of record in the file of this patent:

UNITED STATES PATENTS

| Number | Name | Date |
| --- | --- | --- |
| 2,104,501 | Adams et al. | Jan. 4, 1938 |
| 2,226,389 | Riley | Dec. 24, 1940 |
| 2,285,750 | Swain | June 9, 1942 |
| 2,293,954 | Tiger et al. | Aug. 25, 1942 |
| 2,408,615 | Dudley | Oct. 1, 1946 |
| 2,443,485 | Waksman et al. | June 15, 1948 |

FOREIGN PATENTS

| Number | Country | Date |
| --- | --- | --- |
| 805,092 | France | Nov. 10, 1936 |

OTHER REFERENCES

Kocholaty et al., Arch. Biochem., 1947, pp. 55–64.

Perry, "Chemical Engineers Handbook," 1941, Sec. Ed., p. 1270, 1 page.

Applezweig, JACS, vol. 66 (1944) p. 1990.

Science, vol. 101, page 340, Mar. 20, 1945.

Proceedings, Soc. for Exp. Biol. and Med.; Jan. 1944, pp. 66–69.

Proceedings, Soc. for Exp. Biol. and Med.; vol. 49 (1942); pp. 207–210.

Ind. and Eng. Chem. (Industrial Ed.); Feb. 1943; pp. 186–192.

"The Amberlites," pages 1 to 8, 24; December 5, 1942.